US008675488B1

(12) United States Patent
Sidebottom et al.

(10) Patent No.: US 8,675,488 B1
(45) Date of Patent: Mar. 18, 2014

(54) SUBSCRIBER-BASED NETWORK TRAFFIC MANAGEMENT (75) Inventors: Gregory A. Sidebottom, Ottawa (CA); Claudio Lordello, Kanata (CA); Steffen Ries, Ottawa (CA); Yue Gao, Kanata (CA); Sherine El-Medani, Ottawa (CA); Gregory M. Dalle, Charlestown, MA (US); Jason P. Poirier, Bedford, NH (US); Paulo Lima, Ottawa (CA); Vitaly Dzhitenov, Needham, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 644 days.

(21) Appl. No.: 12/876,901

(22) Filed: Sep. 7, 2010

(51) Int. Cl.
*H04B 7/216* (2006.01)
*G01R 31/08* (2006.01)

(52) U.S. Cl.
USPC ............................ 370/235; 370/229; 370/230

(58) Field of Classification Search
USPC ......................................... 370/235, 229–230
See application file for complete search history.

(56) References Cited

U.S. PATENT DOCUMENTS 7,606,147 B2 10/2009 Luft et al.
2006/0233100 A1* 10/2006 Luft et al. ..................... 370/229
2009/0109845 A1* 4/2009 Andreasen et al. ........... 370/230

OTHER PUBLICATIONS

U.S. Appl. No. 12/235,677, entitled "Forwarding Plane Configuration for Separation of Services and Forwarding in an Integrated Services Router," filed Sep. 23, 2008.

* cited by examiner

*Primary Examiner* — Ian N Moore
*Assistant Examiner* — Kiet Tang
(74) *Attorney, Agent, or Firm* — Shumaker & Sieffert, P.A.

(57) ABSTRACT

In general, the invention is directed to techniques for offloading per-subscriber traffic management from an access gateway to one or more upstream service nodes within a service provider network. For example, as described herein, an upstream service node receives a new packet flow for a subscriber and sends packet flow information, such as a network address, to a session and resource controller (SRC). The SRC maintains a table of subscriber attachment sessions and maps the packet flow information to a subscriber attachment session in the table to obtain a subscriber identifier for a subscriber. The SRC then determines subscriber-specific services to be applied to subscriber data traffic, transforms the services to a set of one or more enforcement policies, and returns the enforcement policies to the service node. In turn, the service node applies the enforcement policies for the subscriber-specific services to the subscriber data traffic in the packet flow.

26 Claims, 7 Drawing Sheets

SUBSCRIBER-BASED NETWORK TRAFFIC MANAGEMENT

TECHNICAL FIELD

The invention relates to computer networks and, more particularly, to managing traffic within computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services.

Because the access gateways are positioned near the edge of the service provider network directly upstream from the subscribers and operate to provide an operational endpoint (i.e., terminate) the subscriber connections (e.g., digital subscriber line- or cable-based connections) into the service provider network, the access gateways typically provide mechanisms for identifying subscriber traffic and providing subscriber-specific services. For example, the access gateways may include an integrated authentication, authorization, and accounting (AAA) component with which to authenticate individual subscribers. Conventionally, the access gateways associate network traffic with a subscriber identity to map predefined policies for the subscriber or subscriber class to the associated network traffic. The access gateways then apply the subscriber policies to manage subscriber traffic on a per-subscriber basis as such traffic traverses the service provider core network boundary.

SUMMARY

In general, this disclosure describes techniques for offloading per-subscriber traffic management from the access gateways to one or more upstream service nodes within the service provider network. Heterogeneous access networks connect many thousands of subscribers to any number of access gateway types, such as Broadband Remote Access Servers (BRASs), Cable Modem Termination Systems (CMTSs), and Gateway GPRS Support Nodes (GGSNs), that may have varying capabilities and scalability limitations and yet face ever-increasing demands for both subscriber connection management and subscriber-specific traffic management services. Although an access gateway, as a connection terminus and thus a transport node for all subscriber traffic for a particular subscriber device, is an established location at which to perform subscriber-specific traffic management services, coupling subscriber access and traffic management at an access gateway may restrict or prevent independent scaling and independent optimization of these disparate functions.

In accordance with the techniques described herein, a service provider deploys one or more intermediate service nodes in the service provider (SP) network upstream from the access gateways to route traffic through the network. Although in some embodiments the service nodes provide a generalized layer three (L3) forwarding infrastructure, the service nodes include additional functionality that allow the service nodes to easily be dynamically configured by other components within the service provider network to apply services to subscriber traffic based on the subscriber identity. The service nodes are decoupled from the subscriber access management functions and thus may be optimized for service processing. The service nodes may implement the services as a set of enforcement policies selectively associated with a subscriber and/or subscriber class.

Subscriber devices attach to the SP core network via an access network in an attachment session, i.e., a communication session that couples a subscriber device to an access gateway to provide access to the SP core network. A session and resource controller (SRC) stores a description of each of the active attachment sessions upon receiving such descriptions from the access gateways via an access gateway manager. The description includes, for each active subscriber session, a subscriber identity and an IP address for the subscriber device. In addition, the SRC maps a respective set of services to each of the subscribers that the service nodes are to apply to traffic for the subscriber.

To identify a subscriber to associate with subscriber traffic, the service nodes employ a packet-triggered subscriber and policy control (PTSP) interface to signal to the SRC when a particular service node detects a new packet flow. The SRC receives details of the new packet flow and associates the new packet flow with a subscriber identity when the subscriber has an active attachment session. The SRC then creates a subscriber session, instantiates the services mapped to the subscriber as service sessions for the subscriber, and installs policies for the respective service sessions to the service node handling the new packet flow. The service node thereafter applies the policies to manage the new packet flow in a subscriber-specific manner. For example, the policies may cause the service node to selectively redirect subscriber data traffic for a particular subscriber toward (or away from) a services complex that applies a service to the subscriber data traffic. In some instances, an application server may interface with the SRC to direct the SRC to dynamically instantiate a new service for a subscriber and cause the service nodes to apply the new service.

In one embodiment, the invention is directed to an intermediate network device for providing subscriber-specific services upstream from an access network, the intermediate network device comprising a network interface to exchange, with a layer three (L3) access device of an access network, a plurality of packet flows that each carry subscriber data traffic for a respective one of a plurality of subscribers. The intermediate network device further comprises a packet-triggered subscriber and policy interface (PTSP) client to send packet flow information for a first one of the packet flows to a session and resource controller (SRC), wherein the packet flow information comprises a network address for a subscriber device that operates as an end-point of the first packet flow, wherein the PTSP client receives from the SRC, responsive to sending the packet flow information, an enforcement policy, wherein the enforcement policy represents a subscriber-specific service mapped to the network address by the SRC. The intermediate network device also comprises a services unit to apply the enforcement policy to first subscriber data traffic carried by the first packet flow.

In another embodiment, the invention is directed to a session and resource controller (SRC) comprising a session repository to store an attachment sessions table and a service sessions table, wherein the attachment sessions table comprises one or more subscriber attachment records that each map a network address to a subscriber identifier, and wherein the service sessions table comprises one or more service sessions records that each map a service to a subscriber identifier. The SRC further comprises a subscriber attachment front end to receive attachment notification messages for a plurality of subscribers, wherein each attachment notification message includes a mapping of a respective network address to a respective subscriber identifier, and wherein the subscriber attachment front end stores the mappings to the attachment sessions table as subscriber attachment records. The SRC also comprises a service activation engine to receive, from one or more intermediate network devices, network addresses that each characterizes a packet flow traversing one of the intermediate network devices, wherein the service activation engine, upon receiving a first network address from a first one of the intermediate network devices, queries the attachment sessions table using the first network address to obtain a first subscriber identifier mapped to the network address; queries the service sessions table using the first subscriber identifier to obtain a subscriber-specific service to apply to the packet flow characterized by the first network address; and sends service information for the subscriber-specific service to the first intermediate network device to cause the first intermediate network device to apply the subscriber-specific service to subscriber data traffic carried by the packet flow characterized by the network address.

In another embodiment, the invention is directed to a method for applying policies with an intermediate network device to subscriber data traffic, comprising the steps of exchanging, with a layer three edge device situated between the intermediate network device and an access network, a plurality of packet flows that each carry subscriber data traffic for a respective one of a plurality of subscribers. The method also includes the step of sending packet flow information for a first one of the packet flows from the intermediate network device to a session and resource controller, wherein the packet flow information comprises a network address for a subscriber device that operates as an end-point of the first packet flow. The method further comprises the step of receiving an enforcement policy with the intermediate network device from the session and resource controller, wherein the enforcement policy represents a subscriber-specific service mapped to the network address. The method further comprises the step of applying the enforcement policy with the intermediate network device to first subscriber data traffic carried by the first packet flow.

In another embodiment, the invention is directed to a method comprising the steps of receiving, with a session and resource controller (SRC), an attachment notification message from a first network device, wherein the attachment notification message maps a network address to a subscriber identifier. The method also includes the steps of receiving, with the SRC from a second network device, a network address that characterizes a packet flow traversing the second network device, and mapping the network address to the subscriber identifier. The method also includes the steps of determining a subscriber-specific service to apply to subscriber data traffic for a subscriber identified by the subscriber identifier, and sending service information for the subscriber-specific service to the second network device to cause the second network device to apply the subscriber-specific service to the subscriber data traffic, carried by the packet flow, for the subscriber.

In another embodiment, the invention is directed to a system. The system comprises an access gateway of a service provider network, a session resource controller, and first and second intermediate network devices of a service provider network located upstream from the access gateway in the service provider network, the first and second intermediate network devices each comprising: a network interface to exchange a respective packet flow for a subscriber with the access gateway; a packet-triggered subscriber and policy control client to send packet flow information that characterizes the packet flow to the session resource controller and to receive an enforcement policy for packet flow; and a service unit to apply the enforcement policy to the packet flow. The session resource controller comprises: an attachment sessions table comprising one or more attachment session records that each map packet flow information to a subscriber identifier. The session resource controller also comprises a service sessions table comprising one or more service session records that each map a service to a subscriber identifier. The session resource controller also comprises a service activation engine to receive packet flow information from the first intermediate network device and to receive identical packet flow information from the second intermediate network device, wherein the service activation engine uses the packet flow information to determine a subscriber identifier from the attachment sessions table, wherein the service activation engine uses the subscriber identifier to determine a subscriber-specific service from the service sessions table, wherein the service activation engine sends an enforcement policy for the subscriber-specific service to the first and second intermediate network devices, and wherein the respective service units of the first and second intermediate network devices apply the enforcement policy to subscriber data traffic carried by the respective packet flow for the subscriber.

The techniques herein described may provide one or more advantages. For example, decoupling traffic management from subscriber access management may allow independent scaling and development of the network resources that perform these respective functions. This may allow the service provider to offer additional services and yet avoid increasing the demand on access gateways, which may otherwise require upgrading or replacing the gateways. In addition, by pushing traffic management from the SP network edge to the service nodes, the techniques support load balancing and redundant network paths for subscriber traffic. For while different packet flows for a particular subscriber may traverse multiple service nodes because of load balancing or redundancy, for example, the service nodes may nevertheless handle each of the packet flows on a per-subscriber basis. Moreover, the techniques may enable the service nodes to selectively redirect subscriber traffic along preferred network paths based on subscriber identity, traffic characteristics, and/or subscriber device properties.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
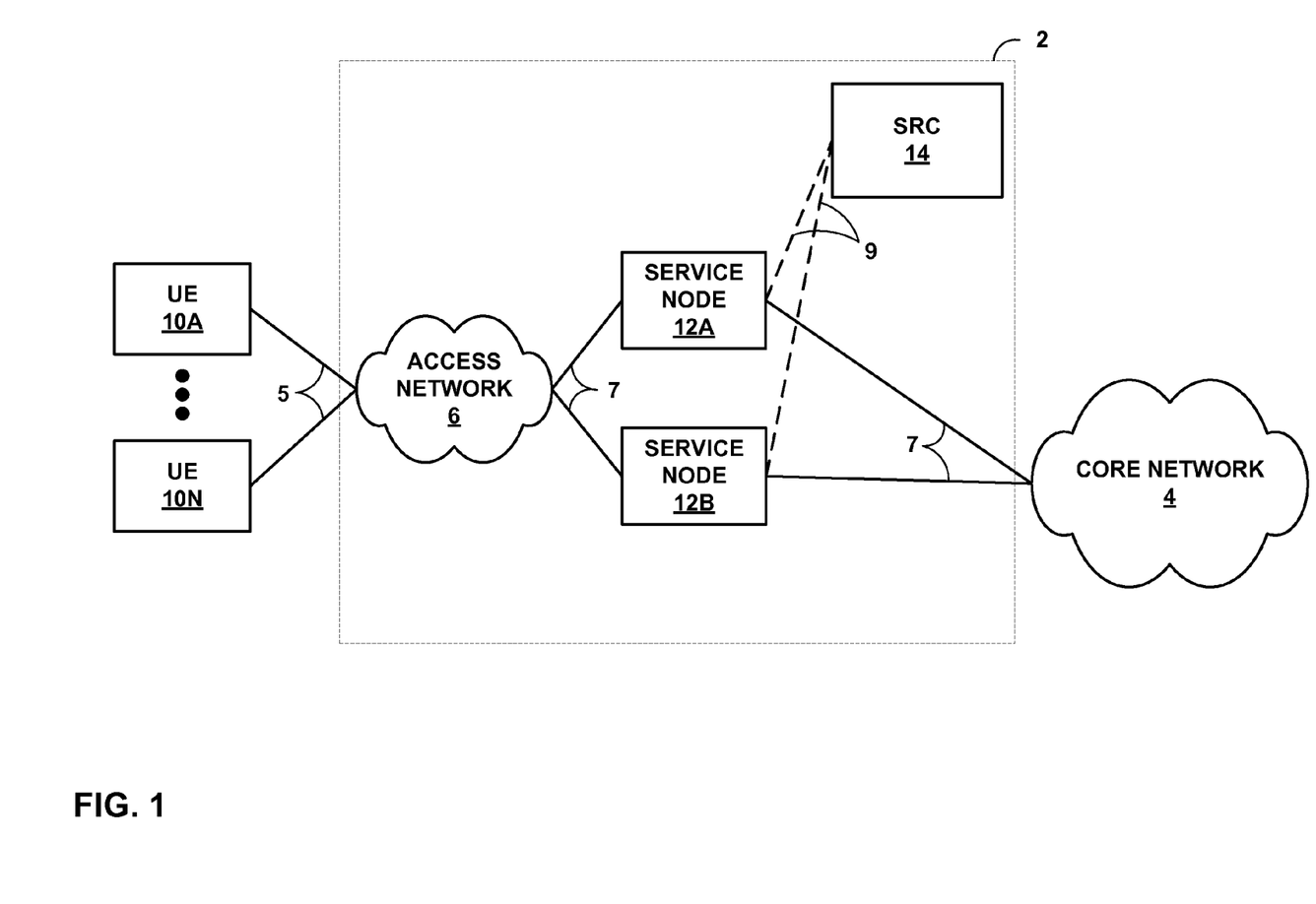
FIG. 1 is a block diagram illustrating an exemplary network system that operates in accordance with the techniques of this disclosure.

FIG. 1 is a block diagram illustrating an exemplary service provider (SP) network 2 in which service nodes 12A-12B ("service nodes 12") transport network data traffic between access network 6 and core network 4. That is, service nodes 12 are upstream (i.e., core side) of access network 6 that provides all components necessary for receiving and terminating subscriber-specific connections so as to produce packet-based communications. Moreover, service nodes are positioned between access network 6 and core network 4 that provides a packet-based infrastructure for accessing network resources, such as a public network. In this way, service nodes 12 may be considered intermediate network devices.

User equipment 10A-10N ("UE 10") attach to SP network 2 via access network 6 to obtain services offered by SP network 2 to subscribers. UE 10 are subscriber devices and may each comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of SP network 2. A subscriber may represent, for instance, an enterprise, a residential subscriber, or a mobile subscriber. UE 10 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), or wired Ethernet.

Access network 6 represents a network that aggregates data traffic from one or more subscribers for transport to/from core network 4 of SP network 2. Access network 6 includes network nodes that execute communication protocols to transport control and user data to facilitate communication between UE 10 and core network 4. Access network 6 may comprise, for example, digital subscriber line access multiplexers (DSLAM), switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways, packet data network (PDN) gateways, and eNodeBs. The elements of access network 6 may support a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), among others. UE 10 may have a dedicated subscriber interface, e.g., an ATM virtual circuit (VC) or an Ethernet virtual local area network (VLAN), to access network 6.

A network service provider that administers SP network 2 offers services to subscribers, e.g., UE 10, that access the service provider network. Services offered may include, for example, traditional Internet access, Voice-over-Internet Protocol (VoIP), video and multimedia services, and security services. Core network 4 may support multiple types of access network infrastructures that connect to service provider network access gateways to provide access to the offered services.

Core network 4 may represent a public network that is owned and operated by a service provider to interconnect a plurality of networks, such as access network 6. Core network 4 may implement Multi-Protocol Label Switching (MPLS) forwarding and in such instances may be referred to as an MPLS network. In some instances, core network 4 represents a plurality of interconnected autonomous systems, such as the Internet, that offers services from one or more service providers.

Transport links 7 couple service nodes 12 to access network 6 and core network 4. Service nodes 12 may thus be considered as located "behind" the access network. All network traffic exchanged between access network 6 and core network 4 traverses at least one of service nodes 12. Service nodes 12 and/or transport links 7 may constitute part of a backhaul network, which may include land-based transmission lines, frequently leased by a service provider, to transport data and control traffic between access network 6 and core network 4. The backhaul network typically also includes switches, aggregation devices, and routers. In some embodiments, service nodes 12 constitute part of core network 4 as intermediate network devices to transport packets between access network 6 and other parts of core network 4.

Session and resource controller 14 ("SRC 14") of SP network 2 ties the service layer to the network layer by applying policy and control functions to network traffic. Such policy and control functions may include, for example, policy management, subscriber management and authentication, authorization, and accounting (AAA), as well as bandwidth management and network resource control. SRC 14 maintains directories of subscriber profiles, network resources, policies, and service configuration information that the SRC then uses to provision services and determine policies for subscribers. In some embodiments, SRC 14 is located within core network 4. SRC 14 is a networked device and may comprise, for instance, a server, a controller, a service blade within or software executing on a router or other network device, or a collection of such components.

In accordance with the techniques of this disclosure, service nodes 12 apply services to subscriber data traffic based on an identity of the subscriber. Such services may include forwarding, filtering, rate limiting, marking, accounting, policy-based routing and redirection, advertisement insertion, and traffic shaping, for instance. Service nodes 12 may comprise a network edge or core router that routes network packets to/from access network 6. In some embodiments, service nodes 12 comprise one or more MX-series routers manufactured by Juniper Networks, Inc., of Sunnyvale, Calif.

In another embodiment, service nodes 12 comprise a switching device that forwards layer two (L2) traffic based on, for example, MAC layer addresses. L2 traffic may include Ethernet frames addressable by MAC layer addresses that may be used, in accordance with the techniques herein described, to identify a subscriber or subscriber class.

When one of UE 10 attaches to SP network 4 using access network 6, SRC 14 receives from access network 6 a subscriber identity for the attached UE as well as an associated network address (e.g., an IP address) that the attached UE uses to source and receive subscriber data traffic to/from SP network 2. SRC 14 stores the subscriber identity and associated network address as a record of a currently active attachment session.

Any attached one of UE 10 may begin exchanging data packets with core network 4, and such packets traverse at least one of service nodes 12 as members of at least one packet flow. The term "packet flow" refers to a set of packets originating from a particular source device and sent to a particular destination device as part of an application communication session between the source and destination device. A flow of packets, in either the upstream (sourced by UE 10) or downstream (destined for UE 10) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. Service nodes 12 may identify an application using deep packet inspection (DPI).

While service nodes 12 may identify a new subscriber network address due to detection of a new packet flow, a packet flow alone does not identify the subscriber associated with the subscriber network address. Therefore, when one of service nodes 12 detects a new packet flow, the service node sends a network address of the packet flow that represents the subscriber to SRC 14 via one of communication links 9. SRC 14 associates a network address received from one of service nodes 12 with a subscriber identity for a currently active attachment session. For example, SRC 14 uses the received network address to key into an active attachment session table, maintained by SRC 14 and comprising records for each of the active attachment sessions within SP network 2, to obtain an associated subscriber identity for the network address.

SRC 14 uses the subscriber identity to determine a subscriber profile to identify services that service nodes 12 are to apply to the new packet flow. SRC 14 translates any identified services to enforcement policies and sends the policies to the service node that transports the new packet flow. An enforcement policy includes a set of actions that a service node is to perform upon the occurrence of a condition that characterizes the packet flow in some way. For example, a condition may relate to an application protocol or other application information, or a source address. The actions implement the various exemplary services listed above that service nodes 12 apply to subscriber data traffic. Upon receiving the policies, the service node applies the subscriber-specific enforcement policies to the new packet flow. In this way, service nodes 12 apply policies to packet flows based on the identity of the subscribers associated with the packet flows.

The described techniques may allow the AAA and other subscriber attachment functions performed by access network 6 to be decoupled from application of various services to subscriber data traffic. That is, by using SRC 14 to maintain subscriber profiles and service information, the techniques enable service nodes 12 to avoid unnecessarily storing and managing subscriber, service, and other configuration information for subscribers that are not attached to SP network 2 and services that are not instantiated by service nodes 12. As a result, service nodes 12 may handle each of the packet flows on a per-subscriber basis despite a logical and geographical separation from access network 6. Service nodes 12 may thus scale independently of access network 6 components and thereby relieve infrastructure pressures on access network 6 due to compounding service requirements for an increasing number of subscribers. In addition, the described techniques may enable the service provider to distribute subscriber traffic to a plurality of service nodes 12 and nevertheless apply services to the traffic on a per-subscriber basis using the service nodes.

Figure 2:
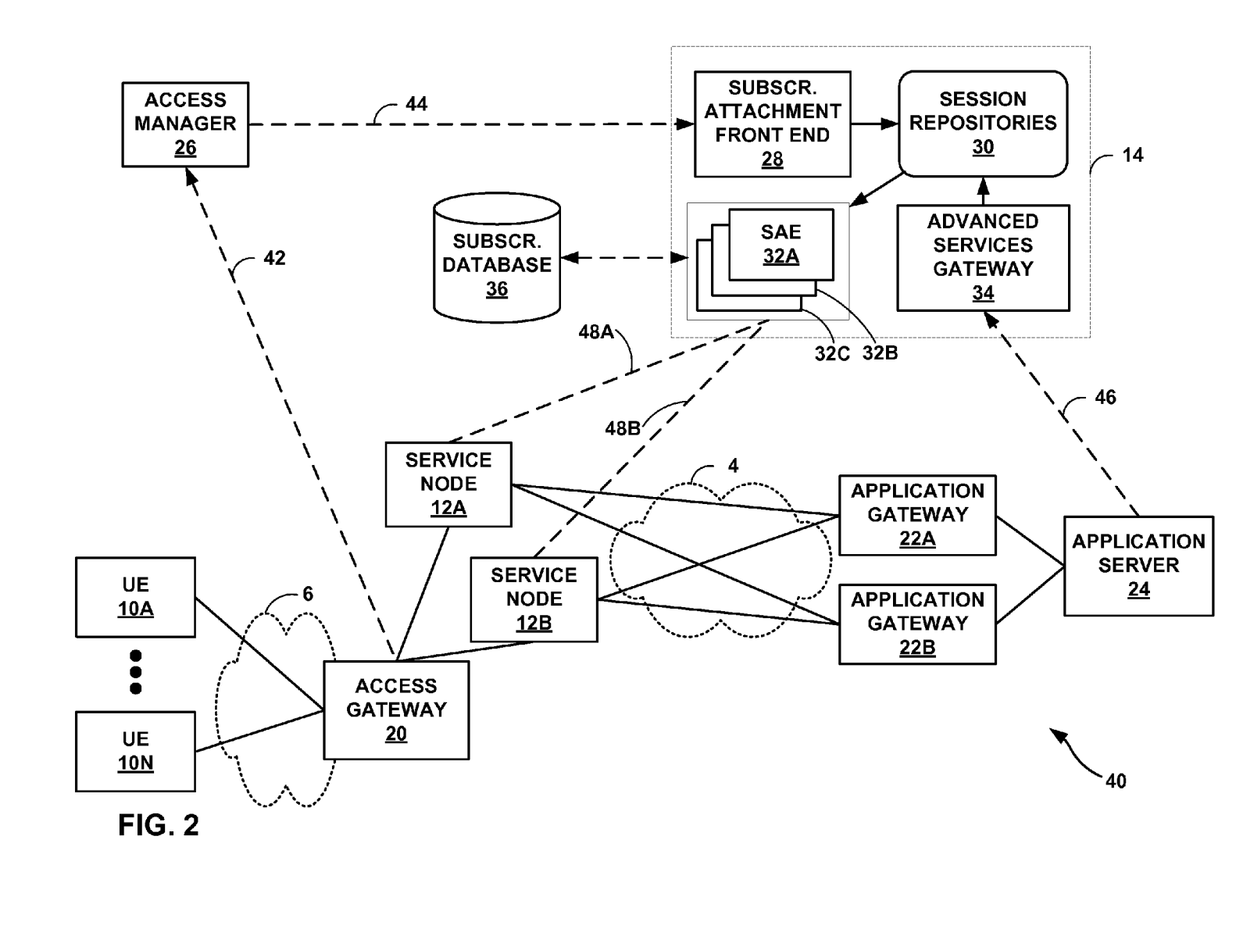
FIG. 2 is a block diagram illustrating an exemplary network system that operates in accordance with the techniques of this disclosure.

FIG. 2 is a block diagram illustrating an exemplary network system 40 that performs subscriber-specific service techniques as described in this disclosure. Elements of network system 40 may represent elements of SP network 2 illustrated in FIG. 1. For example, SRC 14 of FIG. 1 is illustrated in further detail as SRC 14 of network system 2. As another example, core network 4 and access network 6 of network system 2 may represent the core and access networks of FIG. 1, respectively. In various embodiments, SRC 14 and/or access manager 26 may be logically located within core network 4 or access network 6. Core network 4 may offer virtual private networking (VPN) services using, for example, a virtual private LAN service (VPLS) or a virtual LAN.

UE 10 connect via access network 6 to core network 4, which transports data and control packets for services provided by application server 24. Exemplary services offered by application server 24 include video and multimedia content services, a VoIP service, a bulk data delivery service, web applications, web services, and/or other applications. Application server 24 connects to core network 4 via one of application gateways 22A-22B ("application gateways 22"), which may each comprise, for example, a provider edge router.

Application gateways 22 may be configured differently by a service provider or by another entity to apply different services to subscriber data traffic traversing the respective gateway. For example, application gateway 22A may forward subscriber data traffic to a service complex that tailors the application data carried by the traffic to UE 10. As a result, a service provider may provide differential services to subscriber data traffic that traverse core network 4.

Access gateway 20 is a layer three network edge device that manages subscriber attachment sessions and routes subscriber data traffic to application gateways 22 via service nodes 12. Access manager 26 authenticates subscriber devices on behalf of access gateway 20, authorizes the devices to access core network 4, and provides network configuration information to the devices. When one of UE 10 attempt to attach to core network 4, access gateway 20 authenticates the user equipment by interfacing to access manager 26 using a AAA protocol, such as Remote Authentication Dial-In User Service (RADIUS) or the Diameter protocol, to authenticate the subscriber device or a user thereof. Access manager 26 may respond by assigning a network address to one of UE 10 as part of an authentication/ authorization process. Access gateway 20 comprises, for example, a GGSN, an edge router such as a BRAS, a CMTS, a switch, or another network device. Access manager 26 may comprise a RADIUS server, a Diameter server, or other authorization device.

Upon granting access to one of UE 10, access gateway 20 sends attachment notification message 42 to access manger 26, which relays the message as attachment notification message 44 to subscriber attachment front end 28 of SRC 14. In this way, SRC 14 becomes aware of a new attachment session participated in by the newly attached UE. Attachment notification message 44 includes information with which to identify a subscriber that has attached to core network 4 and to associate the subscriber with a network address that is routable within core network 4. In some instances, attachment notification message 44 includes information with which to identify a subscriber class in which the newly attached subscriber is a member. Attachment notification message 44 may also include other information to characterize an attachment session, such as available bandwidth.

Subscriber identification information may include, for example, a user name, an international mobile subscriber identity (IMSI), a device type identifier such as an international mobile equipment identity (IMEI), an access type identifier, an integrated services digital network (ISDN) number, or an access point name (APN). To associate the subscriber (or subscriber class) with a routable network address, attachment notification message 44 also includes a network address for the attached subscriber, such as an IPv4 or IPv6 network address. In embodiments of core network 4 that provide VPN services, where the newly attached one of UE 10 participates in a VPN, attachment notification message 44 includes a VPN identifier to provide an appropriate scope in which the network address assigned to the UE is routable by core network 4.

Subscriber attachment front end 28 of SRC 14 receives attachment notification message 44 and stores the subscriber identification and network address information as an attachment session record in session repositories 30 of SRC 14. Session repositories 30 stores attachment session records for those UE 10 attached to access gateway 20 in an attachment sessions table and may maintain the table in the form of one of a variety of data structures, such as tables, radix trees, flat files, and databases. An attachment session for a particular subscriber is uniquely identifiable by a network address. In instances in which the subscriber is a member of a VPN, the attachment session is uniquely identifiable by a combination of a VPN identifier and a network address.

In accordance with the techniques of this disclosure, service activation engines 32A-32C ("SAEs 32") manage service sessions and policies for application by service nodes 12 to subscriber data traffic on a per-subscriber basis. SAEs 32 expose a respective packet-triggered subscriber and policy control (PTSP) interface 48A-48B that allows core network 4 devices, such as service nodes 12, to signal to SAEs 32 when new subscriber packet flows are detected and to allow SAEs 32 to install subscriber-specific policies to service nodes 12 for application to the subscriber packet flows. The respective PTSP interfaces 48 provided by each of SAEs 32 may each comprise a Diameter or other server that enables service node 12 clients to make requests and provide updates to the service activation engines. In some embodiments, each of PTSP interfaces 48 may comprise common open policy service (COPS), RADIUS, or another type of interface.

In addition, SAEs 32 instantiate service sessions and install policies to service nodes 12 for active packet flows traversing service nodes 12. One of SAEs 32 manages the subscriber session for a subscriber, which represents an attachment session for the subscriber and may map to one or more packet flows. Multiple different packet flows for a single subscriber may traverse both service node 12A and/or 12B due to multiple network paths through core network 4. When one of service nodes 12 detects a new packet flow, the service node uses a respective one of PTSP interfaces 48 to signal properties of the new packet flow to one of SAEs 32. In particular, the service nodes 12 send a source and/or destination network address for the new packet flow that the SAE may use to identify a subscriber, for service nodes 12 do not manage attachment sessions for subscribers associated with any of the network addresses in the new packet flow. Rather, access gateway 20 manages subscriber attachment sessions. In some aspects, the service nodes 12 may also send a VPN identifier that specifies a scope of the network addresses in the new packet flow. In some embodiments, each of service nodes 12 is associated with a different one of SAEs 32 based on geographical proximity, for instance.

The SAEs 32 query session repositories 30 using packet flow properties to obtain an attachment session record for a subscriber having a network address that matches one of the packet flow properties. For example, a packet flow may have, as a destination address, a network address assigned to UE 10 during an attachment process. The one of SAEs 32 that receives the packet flow properties from service nodes 12 keys into the attachment sessions table of session repositories 30 to obtain a subscriber identity for the packet flow. In this way, SRC 14 associates subscriber identities with individual packet flows transported by service nodes 12. In some embodiments, SAEs 32 query access manager 26 for an attachment session record to associate an attached subscriber to a packet flow within core network 4.

In the illustrated embodiment, the one of SAEs 32 managing a subscriber session queries subscriber database 36 (illustrated as "subscr. database 36") to obtain subscriber-specific policies for the session. That is, using the subscriber identity for the subscriber session, the managing one of SAEs 32 queries subscriber database 36 for policies mapped to the subscriber. Subscriber database 36 comprises a database server that includes one or more databases to map policies and other subscriber-related data, such as geographic location and demographic information, to subscribers. The managing one of SAEs 32 then installs the policies to the service node 12 that services the session, and the service node applies the policies to the subscriber session. In some instances, SAEs 32 may install a default subscriber policy to service nodes 12 for new subscriber sessions.

Session repositories 30 additionally stores a mapping of service sessions to be applied by service nodes 12 to subscriber sessions according to the particular subscriber. Session repositories 30 maintains the mapping in a service sessions table having records for each of the services to apply to subscriber sessions for a particular subscriber. Session repositories 30 may maintain the table in the form of one of a variety of data structures, such as tables, radix trees, flat files, and databases. For each subscriber session managed, the managing one of SAEs 32 translates service sessions stored in the service sessions table of session repositories 30 to a set of one or more enforcement policies. An enforcement policy is a list of condition-action rules. In general, an enforcement policy condition matches network (i.e., layer three of the Open Systems Interconnect (OSI) model) and/or application layer (i.e., OSI layer seven) data carried by the subscriber data traffic and causes service nodes 12 to apply corresponding actions to subscriber data traffic matched by the service nodes. Exemplary actions specified by enforcement policies include forwarding, filtering, marking, counting, policy routing, advertisement insertion, and other manipulations of the data flows.

Advanced services gateway 34 exposes an application programming interface for SRC 14 by which third parties, such as application server 24, may request a service activation for a subscriber. In one example, application server 24 sends service activation request 46 to advanced services gateway 34, where service activation request 46 includes a subscriber identifier (e.g., a network address) and a service identifier. In some aspects, service activation request 46 also includes a VPN identifier for the subscriber. Advanced services gateway 34 may provide Simple Object Access Protocol (SOAP) procedures, Common Object Request Broker Architecture (CORBA) methods, Remote Procedure Calls (RPCs), a Diameter or RADIUS server, and/or a command line interface, as examples by which a third party or the service provider may modify the subscriber-specific service configuration in SRC 14.

Advanced services gateway 34 receives service activation requests and inserts a record into the service sessions table of session repositories 30 for the new service session to be applied to subscriber sessions for a subscriber. In response, each of SAEs 32 responsible for managing one or more subscriber sessions for the subscriber translates the new service session to a set of one or more enforcement policies. An SAE 32 that manages such a subscriber session sends the translated enforcement policies to the service node 12 that services the subscriber session via a respective one of PTSP interfaces 48. Because multiple SAEs 32 may manage subscriber sessions for a particular subscriber (identified, for example, by a network address), each of SAEs 32 independently determines whether it manages a subscriber session to which a new service session should be applied. In some embodiments, session repositories 30 updates each of SAEs 32 with new service sessions received via advanced services gateway 34.

The service nodes 12 apply received enforcement policies for subscriber sessions to subscriber data traffic for the respective subscriber sessions. In this way, service nodes 12 may apply services to subscriber data traffic on a per-subscriber, per-service basis, thereby allowing services nodes 12 to scale independently of access gateway 20. In addition, service nodes 12 in cooperation with SRC 14 may, using the described techniques, may apply subscriber-specific services to subscriber data traffic for multiple packet flows that may take any number of paths through core network 4 and thus be serviced by any one of service nodes 12.

In one example application of the techniques of this disclosure, service node 12A may detect a new packet flow and send packet flow properties to SAE 32A via PTSP interface 48A. SAE 32A queries the attachment sessions table of session repositories 30 to obtain an attachment record for the corresponding subscriber for the new packet flow. SAE 32A queries the service sessions table of session repositories 30 to obtain default services for the subscriber. In this example, a default service specifies redirection of subscriber data traffic to (or away from) a service complex that manipulates application data within the traffic to, for example, reformat the application data for a particular subscriber device. SAE 32A translates the default service to one or more enforcement policies and downloads the policies to service node 12A via PTSP interface 48A. Service node 12A applies the enforcement policies to the packet flow to redirect the subscriber data traffic to the service complex. In some instances, the enforcement policies cause service node 12A to redirect the subscriber data traffic to a particular one of application gateways 22, e.g., application gateway 22A. Application gateway 22A may then forward the subscriber data traffic to the service complex.

As another example application of the techniques of this disclosure, service node 12B detects a new packet flow and sends packet flow properties to SAE 32B via PTSP interface 48B. SAE 32B queries the attachment sessions table of session repositories 30 to obtain an attachment record for the corresponding subscriber for the new packet flow. SAE 32B then creates a new subscriber session for the new packet flow. Advanced services gateway 34 receives a service activation request 46 for the subscriber, creates a new service session record for the affected subscriber session and stores the service session record to session repositories 30. SAE 32B, as the manager for the subscriber session, activates the service session, translates the service session to enforcement polices and downloads the enforcement policies to service node 12B, which applies the enforcement policies to the packet flow corresponding to the subscriber session.

Figure 3:
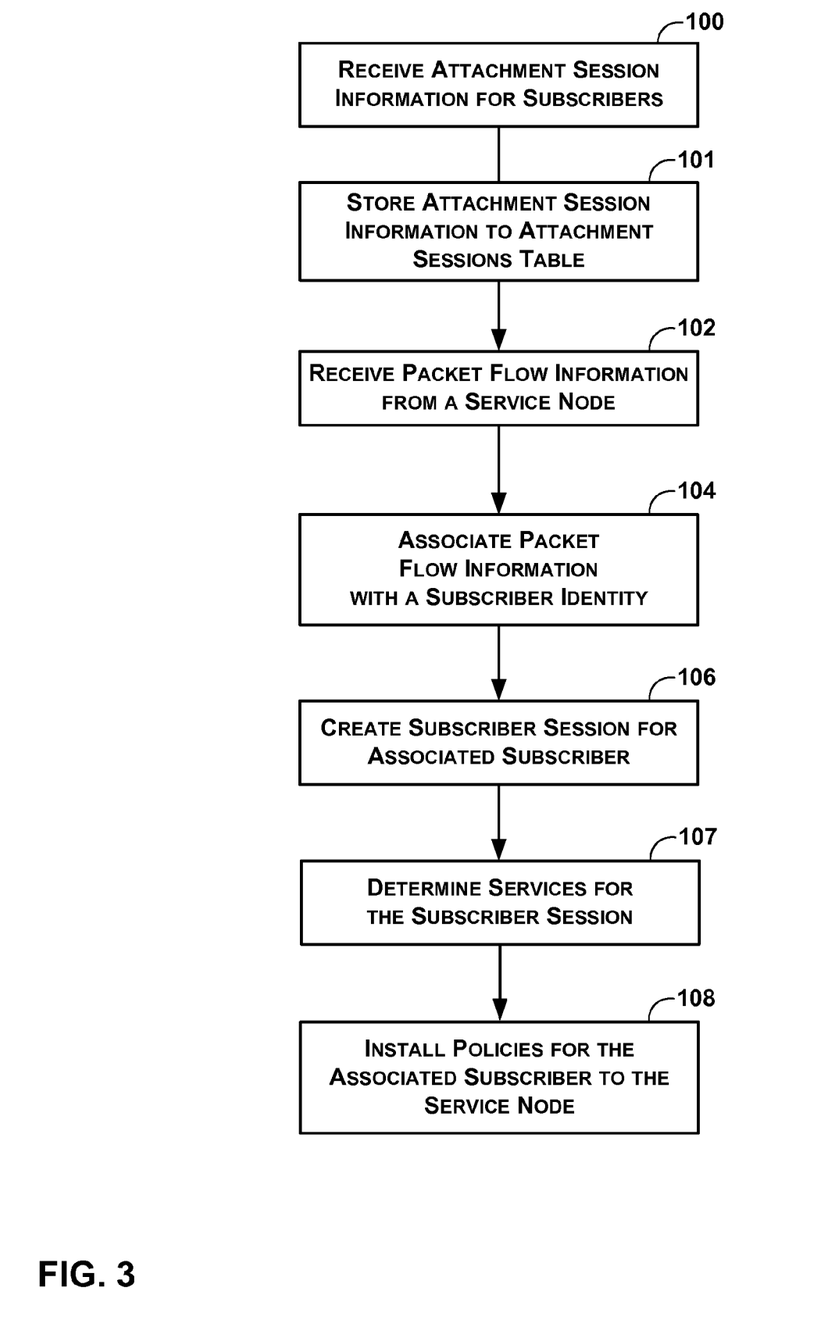
FIG. 3 is a flowchart illustrating an example operation of SRC 14 of FIG. 2 to install subscriber-specific services in a service node in accordance with the techniques of this disclosure.

FIG. 3 is a flowchart illustrating an example operation of SRC 14 of FIG. 2 to install subscriber-specific services in a service node in accordance with the techniques of this disclosure. Initially, subscriber attachment front end 28 receives attachment information for a subscriber (e.g., UE 10A) from an access manager 28 in attachment notification message 44 (100). Subscriber attachment front end 28 stores the attachment session information, including a subscriber identifier, as an attachment session record in the attachment sessions table of session repositories 30 (101). When one of SAEs 32 of SRC 14 receives packet flow information from one of service nodes 12 (102), the SAE attempts to associate the packet flow with a subscriber attachment session in session repositories 30 (104) to obtain a subscriber identity for the packet flow. In particular, SAEs 32 use subscriber identifying information, such as a network address, from the packet flow information to look up an attachment session record in the attachment sessions table that matches the subscriber identifying information. In some embodiments, SRC 14 receives packet flow information prior to receiving attachment information for the corresponding subscriber.

After identifying an associated subscriber for the packet flow, the managing one of SAEs 32 creates a subscriber session for the packet flow (106) and, based on the subscriber identity, determines services to apply to the subscriber session from the service session table of session repositories 30 (107). The managing one of SAEs 32 translates the services to enforcement policies and installs the policies to the service node 12 that transports the packet flow for the subscriber session (108).

Figure 4:
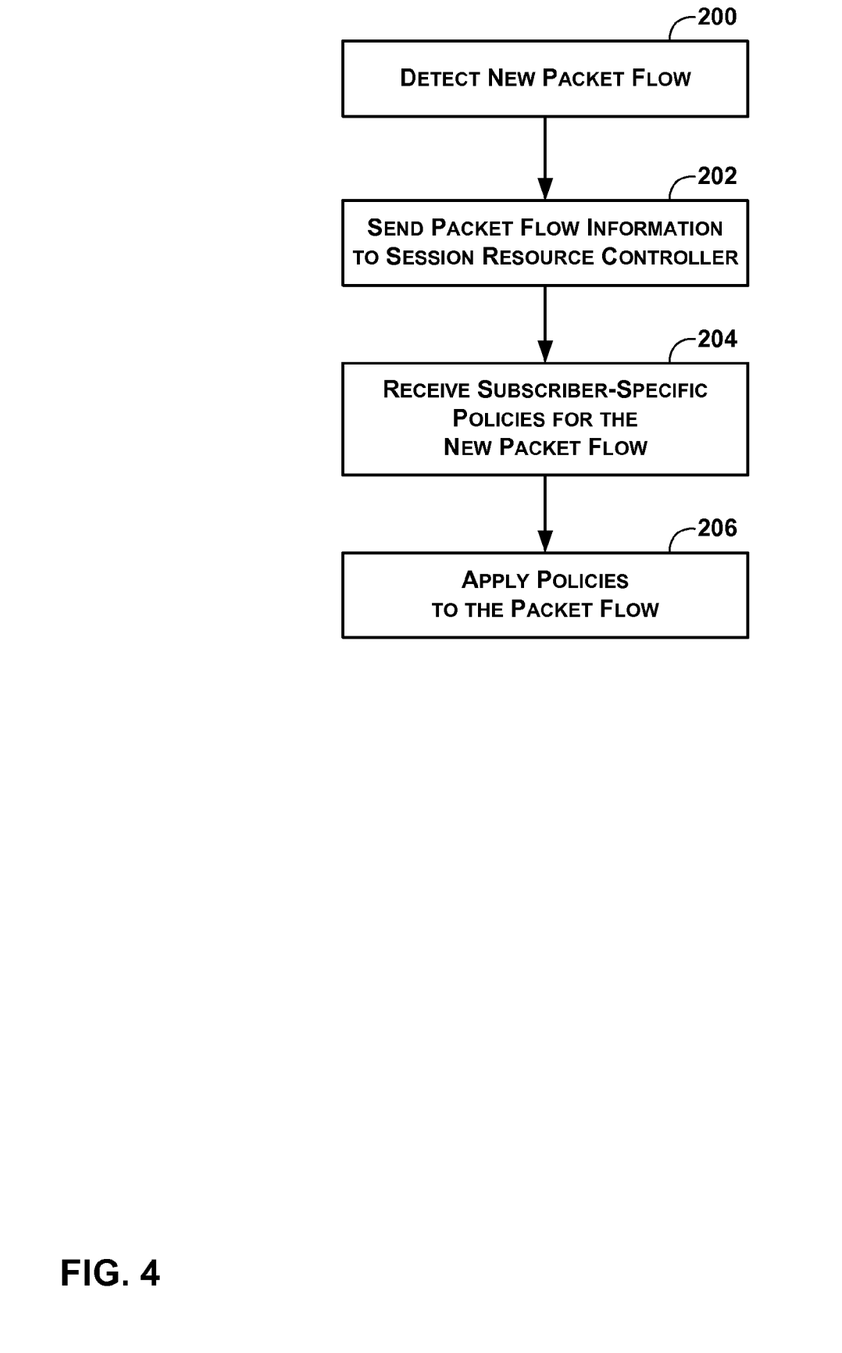
FIG. 4 is a flowchart illustrating an exemplary operation of an intermediate network device to obtain subscriber-specific policies for application to packet flows in accordance with the described techniques.

FIG. 4 is a flowchart illustrating an exemplary operation of one of service nodes 12 to obtain subscriber-specific policies for application to packet flows in accordance with the described techniques. One of service nodes 12, e.g., service node 12A, detects a new packet flow by inspecting packets routed or switched by the node (200). Service node 12A creates a new PTSP interface session for the packet flow with one of SAEs 32 and sends packet flow information to the SAE (202). In response, service node 12A receives enforcement policies that are subscriber-specific (204) and applies these policies to the packet flow to apply subscriber-specific services to subscriber data traffic in the packet flow (206).

Figure 5:
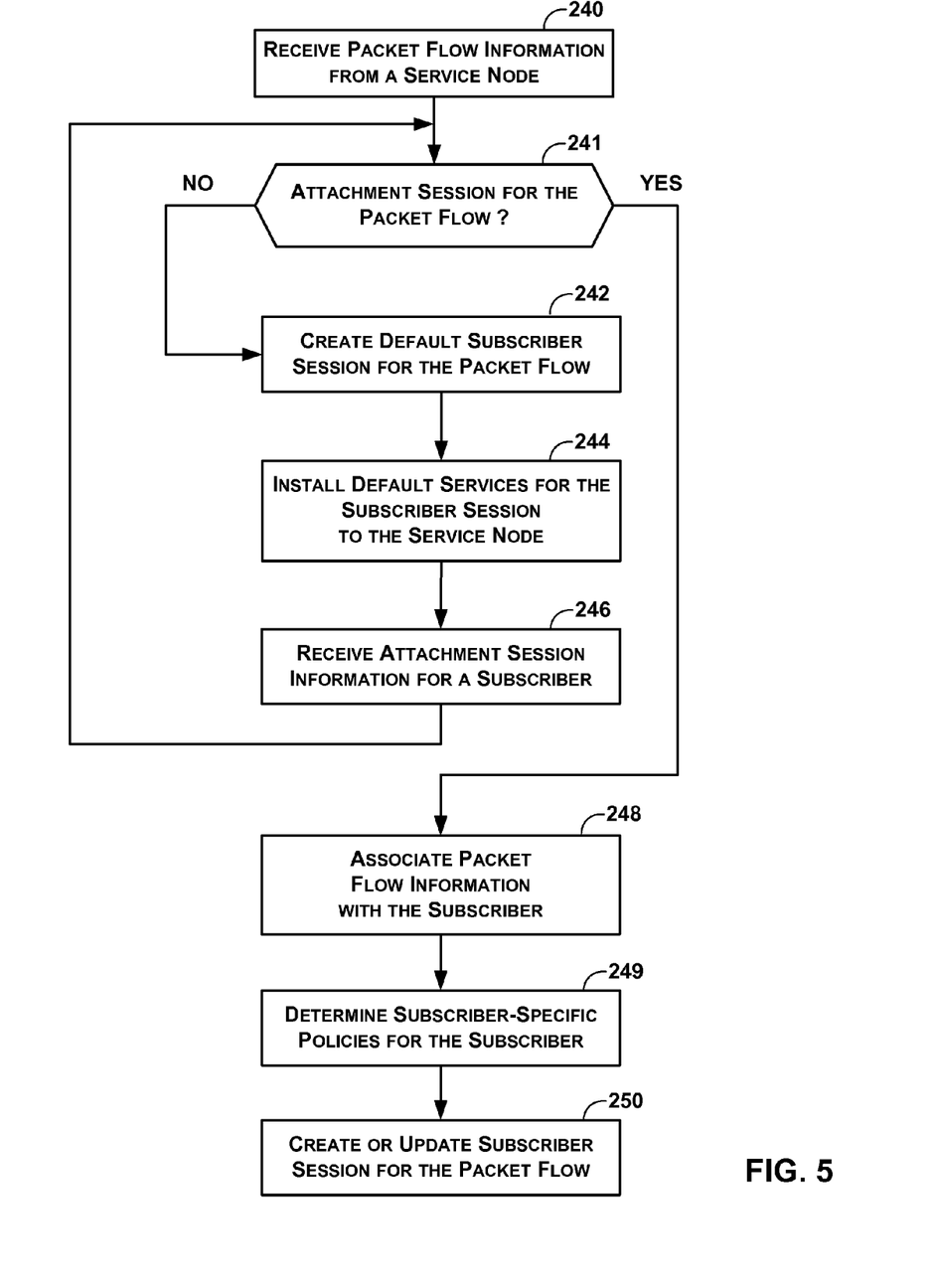
FIG. 5 is a flowchart illustrating an example mode of operation of a controller to activate new subscriber-specific service sessions and install subscriber-specific services in a service node in accordance with the techniques of this disclosure.

FIG. 5 is a flowchart illustrating an example mode of operation of SRC 14 of FIG. 2 to activate new subscriber-specific service sessions and install subscriber-specific services in a service node in accordance with the techniques of this disclosure. Initially, one of SAEs 32 of SRC 14, e.g., SAE 32A, receives packet flow information from one of service nodes 12 (240). SAE 32A attempts to associate the packet flow with a subscriber attachment session in session repositories 30 to obtain a subscriber identity for the packet flow (241). If the attachment session record for the subscriber does not exist (NO branch of 241), SAE 32A creates a default subscriber session for the packet flow (242) and installs services for a default subscriber profile to the service node (244). Subsequently, subscriber attachment front end 28 receives attachment information for the subscriber (e.g., UE 10A) associated with the packet flow from an access manager 28 in attachment notification message 44 (246).

When an attachment session record for the packet flow is present in session repositories 32 (YES branch of 241), SAE 32A successfully associates the subscriber attachment information with the packet flow to identify a subscriber for the packet flow (248). The SAE queries the service session table of session repositories 30 to determine whether any subscriber-specific services are to be instantiated for the subscriber session (249). Subscriber-specific services may include services for a subscriber activated by a third party interfacing to SRC 14 via advanced services gateway 34. SAE 32A then creates the subscriber session having the new services, or, if a default subscriber session for the packet flow already exists, SAE 32A updates the subscriber session with the new services (250). In some instances, updating the subscriber session involves installing enforcement policies to the service node using a PTSP interface session with the service node. In some embodiments, SAEs query a subscriber database for subscriber-specific policies to apply to a subscriber session.

Figure 6:
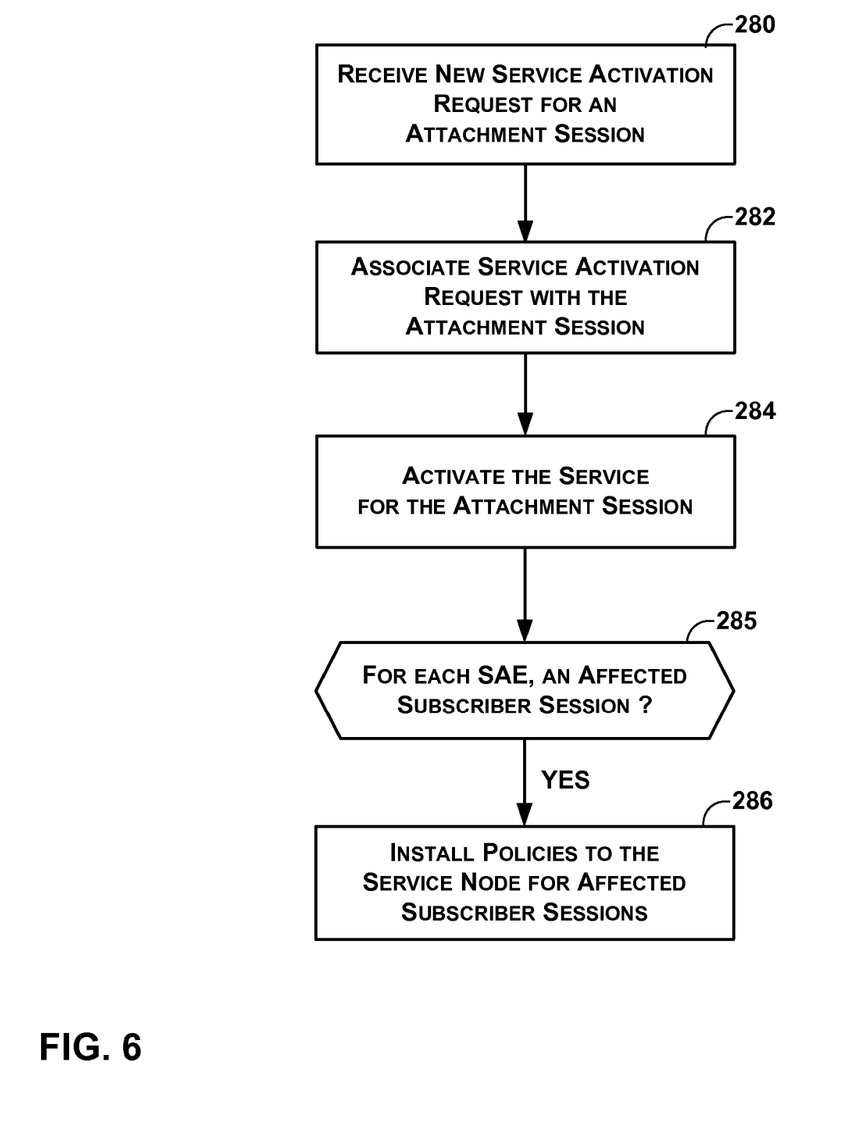
FIG. 6 is a flowchart illustrating an exemplary operation of a controller to responsively activate a service for an attachment session and install subscriber-specific policies for the service to service nodes in accordance with the described techniques.

FIG. 6 is a flowchart illustrating an exemplary operation of SRC 14 of FIG. 2 to responsively activate a service for an attachment session and install subscriber-specific policies for the service to service nodes in accordance with the techniques of this disclosure. Advanced services gateway 34 receives a service activation request 46 to advanced services gateway 34, where service activation request 46 includes a subscriber identifier (e.g., a network address) and a service identifier (280). Advanced services gateway 34 stores the subscriber identifier and service identifier as a service sessions record in the service sessions table of session repositories 30. Advanced services gateway 34 queries session repositories 30 to associate the subscriber identifier with an attachment session. Advanced services gateway 34 then activates the requested service for the attachment session (284). Each of SAEs 32 determines whether it manages a subscriber session for the subscriber identified in the attachment session for which the service was activated. If so (YES branch of 285), the SAE converts the newly activated service to a set of enforcement policies and installs the policies to the service node that applies services to the affected subscriber sessions (286). In this way, SRC 14 enables service nodes 12 to apply subscriber-specific policies to subscriber data traffic. In some embodiments, SRC 14 receives a service activation request for a subscriber session prior to receiving attachment session information in an attachment session notification message. In such embodiments, SRC 14 may apply the services to a default subscriber session.

Figure 7:
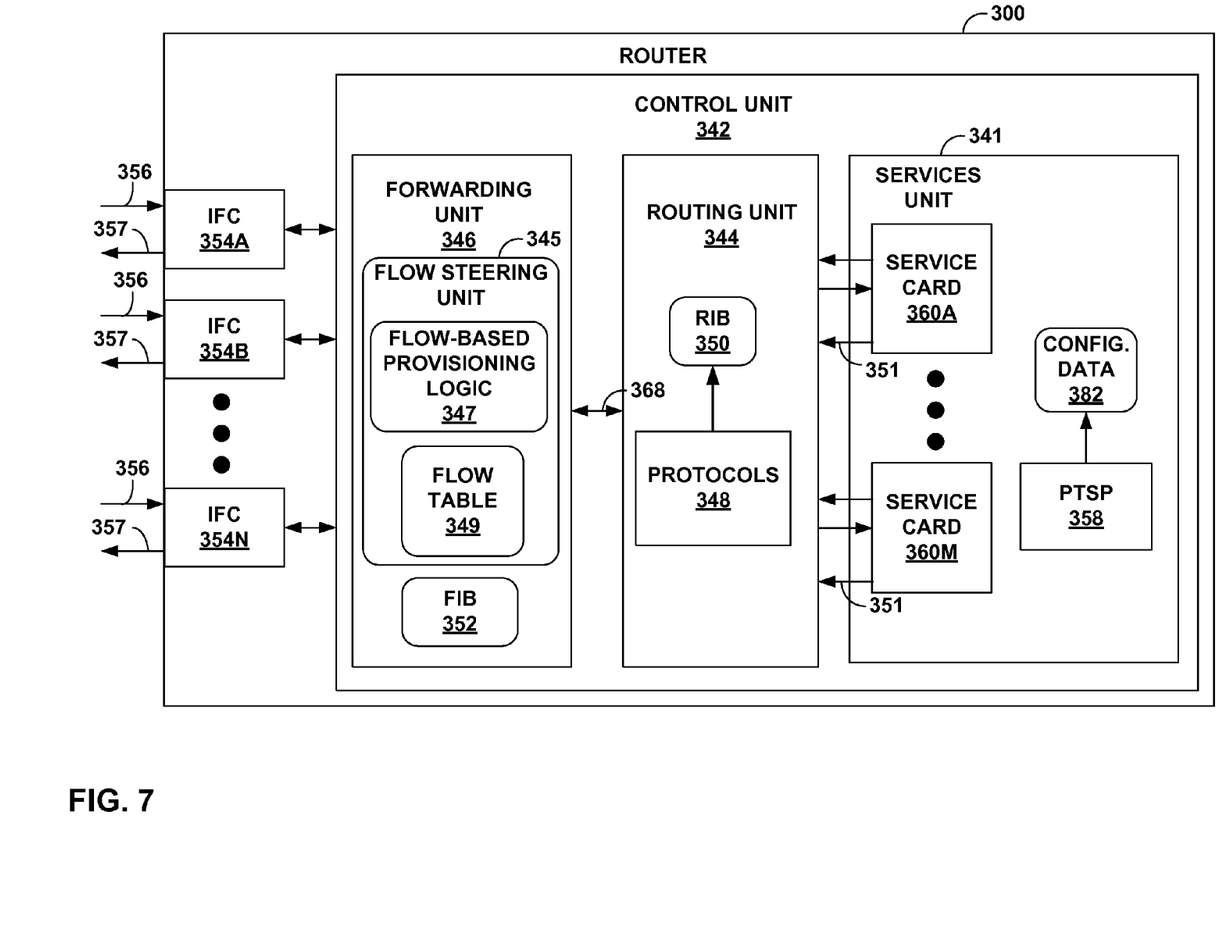
FIG. 7 is a block diagram illustrating example structural components of a router in accordance with the principles of the described techniques.

FIG. 7 is a block diagram illustrating router 300 that provides packet flow information to service activation units using packet-triggered subscriber and policy control (PTSP) interface, receives subscriber-specific policies from the services activation units via the PTSP interface, and applies the policies to subscriber data traffic in accordance with the principles of the invention. Router 300 may represent any of service nodes 12 of FIG. 1 or FIG. 2. Router 300 may include services unit 341, which applies services such as enforcement policies as described herein. Service unit 341 may employ service cards 360A-360M ("service cards 360") for applying services to subscriber data traffic. In this example, routing and services are integrated within a single router 300 that uses a shared forwarding unit 346 suitable for high-speed forwarding functions required by routers that process high-volume traffic.

Router 300 comprises a control unit 342 that includes a routing unit 344 coupled to a forwarding unit 346. Routing unit 344 provides an operating environment for routing protocols 348 that perform routing operations. Routing unit 344 is responsible for the maintenance of a routing information base (RIB) 350 to reflect the current topology of a network and other network entities to which it is connected. In particular, routing unit 344 periodically updates RIB 350 to accurately reflect the topology of the network and other entities.

In accordance with RIB 350, forwarding unit 346 maintains forwarding information base (FIB) 352 that associates network destinations with specific next hops and corresponding interface ports. For example, control unit 342 analyzes RIB 350 and generates FIB 352 in accordance with RIB 350. Router 300 includes interface cards 354A-354N ("IFCs 354") that receive and send packets via network links 356 and 357, respectively. IFCs 354 may be coupled to network links 356, 357 via a number of interface ports. Forwarding unit 346 may comprise a switch fabric to forward the multicast packets to the interface cards based on the selected next hops.

Generally, forwarding unit 346 may relay certain packets received from IFCs 354 to service cards 360. Specifically, forwarding unit 346 may include a flow steering unit 345 to selectively direct packets to services unit 341 for processing. That is, flow steering unit 345 receives incoming packet flows and determines whether to send the packets through the services unit 341 for processing within one or more of service cards 360, or whether to bypass the services units 341. An example forwarding plane configuration for separation of services and forwarding in an integrated services router may be found in U.S. patent application Ser. No. 12/235,677, entitled "Forwarding Plane Configuration for Separation of Services and Forwarding in an Integrated Services Router," filed on Sep. 23, 2008, the entire contents of which is incorporated by reference herein.

Service cards 360 receive packets from forwarding unit 346, selectively provide services in accordance with the defined configuration data 382. In some case, service cards may relay the packets or any response packets to control unit 342 for forwarding by forwarding unit 346 in accordance with FIB 352. A number of input and output logical interfaces may couple service cards 360 to control unit 342.

Service cards 360 of services unit 341 may be installed along a backplane or other interconnect of router 300 to perform a variety of services on the packets received from forwarding unit 346. In some cases, a service card 360 may issue commands 351 to dynamically configure a flow table 349 within flow steering unit 345 of forwarding unit 346. For example, flow steering unit 345 receives a packet and analyzes the received packet to identify a packet flow associated with the packet, e.g., using a flow-based provisioning logic 347 to identify an n-tuple based on information carried in the header or body of the packet (e.g., a five-tuple and an input interface). Upon identifying the packet flow, flow steering unit 345 references an internal flow table 349 to determine whether belongs to a new packet flow or a packet flow already recognized by the router 300.

Upon identifying a new packet flow, flow steering unit 345 sends characteristics of the new packet flow, including a source and destination network address, to PTSP client 358 ("PTSP 358") of router 300. PTSP client 358 sends these characteristics as flow information to a session and resource controller (SRC) for the network that employs router 300. PTSP client 358 receives enforcement policies for the new packet flow, which may represent services described herein, e.g., filtering, redirection, marking, quality of service, and the like, and stores the enforcement policies to configuration data 382. PTSP client 358 represents software executing on services unit 341 that connects to a PTSP interface of an SRC to notify the SRC of new packet flows and receive enforcement policies for the packet flows as described herein. In some embodiments, each of service cards 360 comprises an instance of PTSP client 358.

If flow steering unit 345 does not find a match in the flow table 349, which indicates that the packet belongs to a new packet flow, the flow steering unit 345 directs the packet to service cards 360 of services units 341. When the packet is directed to services units 341, one of service cards 360 applies subscriber-specific enforcement policies, as stored in configuration data 382, to those packets that carry subscriber data traffic that requires services of the router. In addition, the service cards 360 may extract and assemble application layer data from the packet, and a deep packet inspection (DPI) unit may perform application analysis to determine enforcement policies to apply.

Upon receiving and processing the packet or packets of a packet flow, service cards 360 may issue a command 351 to install a dynamic filter within the flow table 349 or FIB 352, such as an exact match filter that indicates particular actions to be performed when a packet is received that matches the filter. For example, the installed filter may specify one or more actions to be applied by forwarding unit 346 for the specific packet flow in the data plane of router 300. In addition, the filter may specify that forwarding unit 346 is to direct any matching packets to services unit 341 or to an external services complex for application of subscriber-specific services. In the case that service cards 360 determine no further services need be applied to a packet flow, service cards 360 may install a filter within flow steering unit 345 to specify that subsequent packets of this packet flow session may be processed on a straight path that bypasses services units 341. When flow steering unit 345 receives a subsequent packet of the same packet flow, flow steering unit 345 checks the flow table 349, determines that the packet matches the new dynamic filter, and directs the packet on the appropriate path according to the dynamic filter.

In one embodiment, each of forwarding unit 346 and routing unit 344 may comprise one or more dedicated processors, storage media, hardware, and the like, and may be communicatively coupled by a data communication channel 368. The data communication channel 368 may be a high-speed network connection, bus, shared-memory or other data communication mechanism.

In this way, the operation of router 300 can be viewed as segmented into a control plane, a service plane, and a data plane. The control plane may be seen as provided by routing unit 344 and may include one or more software processes, such as a management daemon and a routing protocol daemon executing on a computing environment provided by one or more microprocessors.

Router 300 may further include a physical chassis (not shown) for housing control unit 342. The chassis has a number of slots (not shown) for receiving a set of cards, including IFCs 354 and service cards 360. Each card may be inserted into a corresponding slot of the chassis for electrically coupling the card to control unit 342 via a bus, backplane, or other electrical communication mechanism.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "non-transitory computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A service node device for providing subscriber-specific services upstream from an access router of an access network and coupled by a communication link to an external session and resource controller (SRC) that manages application services applied at the service node, the service node device comprising:

a network interface to receive an initial packet of a packet flow associated with a subscriber device attached to the access network, wherein the initial packet includes a network address dynamically assigned to the subscriber device by an authentication server upon attachment of the subscriber device to the access network, and wherein the service node device does not store a subscriber identifier associated with the network address when the initial packet is received;

a packet-triggered subscriber and policy interface (PTSP) client to generate a message that includes the network address but does not include a subscriber identifier associated with the network address, wherein the PTSP client sends the message to the external SRC to request an enforcement policy for the network address;

wherein the PTSP client receives, from the external SRC and in response to the message, the enforcement policy, wherein the enforcement policy represents a subscriber-specific service mapped to the network address by the external SRC; and a services unit to apply the enforcement policy to the packet flow.

2. The service node device of claim 1, wherein the enforcement policy represents the subscriber-specific service mapped to the network address by associating a subscriber identifier with the network address and mapping the subscriber-specific service to the subscriber identifier.

3. The service node device of claim 1, wherein the service node device does not manage a subscriber attachment session for a subscriber associated with the network address.

4. The service node device of claim 1, further comprising:
a service unit that stores the enforcement policy as configuration data for the service unit,
wherein the service unit comprises a service card to apply the enforcement policy to the packet flow.

5. The service node device of claim 1, wherein the enforcement policy causes the service card to redirect the packet flow to a service complex.

6. The service node device of claim 1, further comprising:
a forwarding unit having a flow steering unit to determine the packet flow is a new packet flow and identify the network address using the initial packet of the new packet flow,
wherein, upon determining the packet flow is a new packet flow, the flow steering unit sends the network address to the packet-triggered subscriber and policy control (PTSP) client.

7. The service node device of claim 1, wherein the network interface outputs the initial packet to the layer three edge device.

8. The service node device of claim 1,
wherein the service node device is a network router,
wherein the service unit is integrated within the network router, the service unit comprising a service card configured to apply the enforcement policy to the packet flow, and further comprising:
a routing engine comprising a control unit that executes a routing protocol to maintain routing information specifying routes through a network;
a forwarding engine configured by the routing engine to select next hops for packets in accordance with the routing information, the forwarding engine comprising a switch fabric to forward the packets to the interfaces based on the selected next hops, wherein the forwarding engine includes a flow control module that, upon receiving packets from the network, directs one or more of the packets of the packet flow to the service unit for application of the enforcement policy that represents the subscriber-specific service.

9. A session and resource controller (SRC) comprising:
a session repository to store an attachment sessions table and a service sessions table, wherein the attachment sessions table comprises one or more subscriber attachment records that each map a network address to a subscriber identifier, and wherein the service sessions table comprises one or more service sessions records that each map a subscriber identifier to a service;
a subscriber attachment front end to receive an attachment notification message for a subscriber device, wherein the attachment notification message includes a mapping that maps, to a subscriber identifier, a network address dynamically assigned to the subscriber device by an authentication server upon attachment of the subscriber device to an access network, and wherein the subscriber attachment front end stores the mapping to the attachment sessions table as a subscriber attachment record; and
a service activation engine to receive, from an external service node device coupled by a communication link to the SRC, a message that includes a network address, but does not include the subscriber identifier associated with the network address, that characterizes a packet flow traversing the external service node device,
wherein the service activation engine, upon receiving the message from the external service node device:
queries the attachment sessions table using the first network address to obtain the subscriber identifier mapped to the network address;
queries the service sessions table using the subscriber identifier to obtain a subscriber-specific service to apply to the packet flow characterized by the network address; and
sends service information for the subscriber-specific service to the external service node device to cause the external service node device to apply the subscriber-specific service to the packet flow characterized by the network address.

10. The SRC of claim 9,
wherein the service activation engine translates the subscriber-specific service to a set of one or more enforcement policies, and
wherein the service information comprises the enforcement policies.

11. The SRC of claim 9, further comprising:
an advanced services gateway to receive a service activation request for the subscriber-specific service, wherein the service activation request includes the network address and a service identifier for the subscriber-specific service, wherein the advanced services gateway stores the network address and the service identifier as a service sessions record to the service sessions table,
wherein the service activation engine creates a subscriber session for the packet flow characterized by the network address,
wherein the service activation engine uses the network address received in the service activation request to query the attachment sessions table to obtain the subscriber identifier, and
wherein the service activation engine instantiates the subscriber-specific service as a service session for the subscriber session.

12. The SRC of claim 9,
wherein the service activation engine creates a packet-triggered subscriber and policy interface (PTSP) session for communication with the external service node device,
wherein the service activation engine creates a subscriber session for the packet flow characterized by the network address,
wherein the service activation engine associates the PTSP session with the subscriber session, and
wherein the service activation engine sends service information for the subscriber-specific service to the external service node device by determining the PTSP session is associated with the subscriber session and sending the service information for the subscriber-specific service to the external service node device with the PTSP session.

13. The SRC of claim 9,
wherein the external service node device comprises a first external service node device,
wherein the packet flow comprises a first packet flow,
wherein the message comprises a first message, and
wherein the service activation engine, upon receiving the network address in a second message from a second external service node device that is different than the first external service node device:

queries the attachment sessions table using the network address to obtain the subscriber identifier mapped to the network address;

queries the service sessions table using the subscriber identifier to obtain a subscriber-specific service to apply to a second packet flow transported by the second external service node device and characterized by the network address; and sends service information for the subscriber-specific service to the second external service node device to cause the second external service node device to apply the subscriber-specific service to the second packet flow.

14. A method for applying, to a packet flow, policies with a service node device that is located upstream from an access router of an access network a coupled by a communication link to an external session and resource controller (SRC), comprising:

receiving an initial packet of a packet flow associated with a subscriber device attached to the access network, wherein the initial packet includes a network address dynamically assigned to the subscriber device by an authentication server upon attachment of the subscriber device to the access network, and wherein the service node device does not store a subscriber identifier associated with the network address when the initial packet is received;

generating a message that includes the network address but does not include the subscriber identifier associated with the network address and sending the message from the service node device to the external SRC to request an enforcement policy for the network address;

receiving the enforcement policy with the service node device and from the SRC, wherein the enforcement policy represents a subscriber-specific service mapped to the network address; and applying the enforcement policy with the service node device to the packet flow.

15. The method of claim 14, wherein the enforcement policy represents the subscriber-specific service mapped to the network address by the external SRC by associating a subscriber identifier with the network address and mapping the subscriber-specific service to the subscriber identifier.

16. The method of claim 14, further comprising installing the enforcement policy in a services unit of the service node device for application to the packet flow by the services unit.

17. The method of claim 14, further comprising:
determining the packet flow is a new packet flow with a forwarding unit of the service node device;
identifying the network address from the new packet flow with the forwarding unit using the initial packet;
upon determining the packet flow is a new packet flow, creating a packet-triggered subscriber and policy control (PTSP) session with the SRC for the packet flow; and
sending the message to the session and resource controller using the PTSP session.

18. The method of claim 14, further comprising outputting the initial packet from the service node device to the access router.

19. A method comprising:
with a session and resource controller (SRC), storing an attachment sessions table and a service sessions table, wherein the attachment sessions table comprises one or more subscriber attachment records that each map a network address to a subscriber identifier, and wherein the service sessions table comprises one or more service sessions records that each map a subscriber identifier to a service;

receiving, with the SRC, an attachment notification message for a subscriber device, wherein the attachment notification message includes a mapping that maps, to a subscriber identifier, a network address dynamically assigned to the subscriber device by an authentication server upon attachment of the subscriber device to an access network;

storing the mapping to the attachment sessions table as a subscriber attachment record;

receiving, with the SRC from an external service node device, a message that includes a network address, but does not include the subscriber identifier associated with the network address, that characterizes a packet flow traversing the external service node device;

by the SRC and in response to receiving the message, querying the attachment sessions table using the network address to obtain the subscriber identifier mapped to the network address in the subscriber attachment record;

by the SRC and in response to receiving the message, querying the service sessions table using the subscriber identifier to obtain a subscriber-specific service to apply to the packet flow characterized by the network address; and by the SRC and in response to receiving the message, sending service information for the subscriber-specific service to the external service node device to cause the external service node device to apply the subscriber-specific service to the packet flow characterized by the network address.

20. The method of claim 19, further comprising translating the subscriber-specific service to a set of one or more enforcement policies, wherein the service information comprises the enforcement policies.

21. The method of claim 19, further comprising:
creating a subscriber session that corresponds to the packet flow characterized by the network address;
receiving, with the SRC and from an application server, a service activation request for the subscriber-specific service, wherein the service activation request includes the network address and a service identifier for the subscriber-specific service;
storing the network address and the service identifier as a service sessions record to the service sessions table; and
instantiating the subscriber-specific service as a service session for the subscriber session.

22. The method of claim 19, further comprising:
creating a packet-triggered subscriber and policy interface (PTSP) session for communication with the external service node device;
receiving the network address from the external service node device in the PTSP session;
creating, with the SRC, a subscriber session that corresponds to the packet flow; and
associating the PTSP session with the subscriber session,
wherein sending service information for the subscriber-specific service to the external service node device comprises determining the PTSP session is associated with the subscriber session and sending the service information for the subscriber-specific service to the external service node device with the PTSP session.

23. A system comprising:
an access gateway of an access network for a service provider network;

a session and resource controller (SRC) external to the access gateway; and first and second service node devices of the service provider network that are external to and located upstream from the access gateway in the service provider network, wherein the first service node device comprises:

a first network interface to receive a first initial packet for a first packet flow associated with a subscriber device attached to the access network, wherein the first initial packet includes a network address dynamically assigned to the subscriber device by an authentication server upon attachment of the subscriber device to the access network, and wherein the first service node device does not store a subscriber identifier associated with the network address when the first initial packet is received;

a first packet-triggered subscriber and policy interface (PTSP) client to generate a first message that includes the network address but does not include a subscriber identifier associated with the network address and to send the first message to the SRC to request and receive an enforcement policy for the network address; and a first service unit to apply the first enforcement policy to the first packet flow, wherein the second service node device comprises:

a second network interface to receive a second initial packet for a second packet flow associated with the subscriber device, wherein the second initial packet includes the network address, and wherein the second service node device does not store a subscriber identifier associated with the network address when the second initial packet is received;

a second packet-triggered subscriber and policy interface (PTSP) client to generate a second message that includes the network address but does not include the subscriber identifier associated with the network address and to send the second message to the SRC to request and receive the enforcement policy for the network address; and a second service unit to apply the second enforcement policy to the second packet flow, wherein the SRC is external to the first and second service node devices and comprises:

an attachment sessions table comprising one or more attachment session records that each map a network address to a subscriber identifier;

a service sessions table comprising one or more service session records that each map a subscriber identifier to a service;

a service activation engine to receive the first message and the second message, wherein the service activation engine uses the network address received in the first message and the second message to determine a subscriber identifier from the attachment sessions table, wherein the service activation engine uses the subscriber identifier to determine the service from the service sessions table, wherein the service activation engine sends the enforcement policy for the service to the first and second service node devices, and wherein the respective first and second service units of the first and second service node devices apply the enforcement policy to the respective first and second packet flows.

24. The system of claim 23, wherein the session and resource controller further comprises:

an advanced services gateway to receive a service activation request that comprises the network address and a service identifier for the service, wherein the advanced services gateway stores the service identifier and the network address as a service session record in the service sessions table.

25. The system of claim 23, wherein the respective first and second network interfaces output the respective first and second packet flows to the access gateway.

26. The system of claim 23, wherein the enforcement policy causes the first and second service node devices to selectively redirect the first and second packet flows along a particular network path.

* * * * *